(12) United States Patent
Buzek

(10) Patent No.: US 10,942,104 B2
(45) Date of Patent: Mar. 9, 2021

(54) VISCOMETER WITH ROTOR DETECTION

(71) Applicant: ALPHA TECHNOLOGIES SERVICES LLC, Akron, OH (US)

(72) Inventor: Keith Buzek, Akron, OH (US)

(73) Assignee: ALPHA TECHNOLOGIES SERVICES LLC, Akron, OH (US)

( * ) Notice: Subject to any disclaimer, the term of this patent is extended or adjusted under 35 U.S.C. 154(b) by 220 days.

(21) Appl. No.: 16/328,007

(22) PCT Filed: Aug. 18, 2017

(86) PCT No.: PCT/US2017/047558
§ 371 (c)(1),
(2) Date: Feb. 25, 2019

(87) PCT Pub. No.: WO2018/039064
PCT Pub. Date: Mar. 1, 2018

(65) Prior Publication Data
US 2019/0195764 A1    Jun. 27, 2019

Related U.S. Application Data

(60) Provisional application No. 62/379,552, filed on Aug. 25, 2016.

(51) Int. Cl.
*G01N 11/16* (2006.01)
*G01N 11/14* (2006.01)
*G01N 11/00* (2006.01)

(52) U.S. Cl.
CPC ......... *G01N 11/165* (2013.01); *G01N 11/142* (2013.01); *G01N 2011/0006* (2013.01)

(58) Field of Classification Search
CPC ...... G01N 11/00; G01N 11/14; G01N 11/142; G01N 11/16; G01N 11/165; G01N 2011/0006
See application file for complete search history.

(56) References Cited

FOREIGN PATENT DOCUMENTS

| CA | 833240 A | 2/1970 | |
|---|---|---|---|
| CN | 209400373 U | * 9/2019 | ............ G01N 11/14 |
| EP | 0337300 A2 | 10/1989 | |
| ES | 2492240 A1 | 9/2014 | |

* cited by examiner

*Primary Examiner* — Nguyen Q. Ha
(74) *Attorney, Agent, or Firm* — Shumaker, Loop & Kendrick, LLP; James D. Miller

(57) ABSTRACT

A viscometer arrangement includes a detection system for detecting the proper placement of a rotor. An optical detection system may be used to detect the presence of an obstruction between the upper and lower dies while the upper and lower dies are in an open position.

20 Claims, 7 Drawing Sheets

VISCOMETER WITH ROTOR DETECTION

RELATED CASE INFORMATION

This application claims the benefit under 35 U.S.C. § 119 (e) of U.S. Provisional Application Ser. No. 62/379,552, entitled "VISCOMETER WITH ROTOR DETECTION" filed on Aug. 25, 2016.

BACKGROUND

1. Field

Aspects relate generally to a viscometer assembly having rotor detection capabilities and to methods of rotor detection.

2. Discussion of Related Art

Mooney viscometers, which date back to the 1930s, are instruments that are used to measure a property called Mooney viscosity. Mooney viscosity measurements are typically performed on polymers, such as elastomers or rubbers. Generally, Mooney viscosity is a measure of shearing torque. More specifically, Mooney viscosity is a measurement of the torque needed to rotate a disk (typically the head of a rotor) that is imbedded in a sample within a sealed test chamber. Mooney viscometers are also used to measure the time to scorch, which is the time to formation of incipient crosslinks in a rubber compound.

SUMMARY

According to one aspect, a viscometer is provided for measuring properties of a sample material. The viscometer includes a rotor including a rotor head and rotor stem, a motor and a drive shaft coupled to the motor, the rotor being removably couplable to the drive. The viscometer also includes an upper platen, an upper die, a lower platen and a lower die. The upper and lower dies have an open position to receive a sample therebetween and a closed position to define a sealed test chamber that encloses the rotor head and the sample. In the open position, the upper and lower dies are separated by a space. The viscometer also includes a crosshead coupled to the upper platen, where the crosshead is adapted to move the upper platen and the upper die relative to the lower platen and lower die. The viscometer also includes a controller and a transmitter that is positioned to transmit an energy transmission over the lower die and across the space when the upper and lower dies are in the open position. The viscometer also includes a receiver adapted to receive the energy transmission and to output a signal to the controller when the energy transmission is received by the receiver. The controller is configured to control closure of the upper and lower dies in response to receipt of the signal from the receiver. In some embodiments, the viscometer is a Mooney viscometer.

According to another aspect, a method is provided for detecting proper rotor alignment in a viscometer. The method includes an act of providing a rotor that is removably couplable to a drive shaft that drives the rotor, where the rotor includes a rotor head. The method also includes an act of providing an upper platen, an upper die, a lower platen and a lower die, where the upper and lower dies have an open position to receive a sample therebetween and a closed position in which the upper and lower dies define a sealed test chamber that encloses the rotor head and the sample. In the open position, the upper and lower dies are separated by a space. The method also includes an act of transmitting an energy transmission over the lower die and across the space when the upper and lower dies are in the open position. The method also includes an act of sending a signal to a controller when the energy transmission is received by a receiver. The method also includes an act of controlling closure of the upper and lower dies in response to the controller receiving the signal from the receiver.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

As discussed above, Mooney viscosity is a measurement of the torque needed to rotate a disk (typically the head of a rotor) that is imbedded in a sample of material within a sealed test chamber. The test chamber is typically cylindrical and defined by a pair of heated dies that form together the chamber. Prior to the actual torque measurement, the dies press upon, and in some cases, heat the sample, causing the sample to surround and enclose the rotor head. The rotor is typically turned with a pre-defined speed (e.g., 2 RPM). The torque needed to turn the rotor at this pre-defined speed is measured by a torque measurement system (e.g., torque transducer), which is coupled to the rotor stem.

Figure 1:
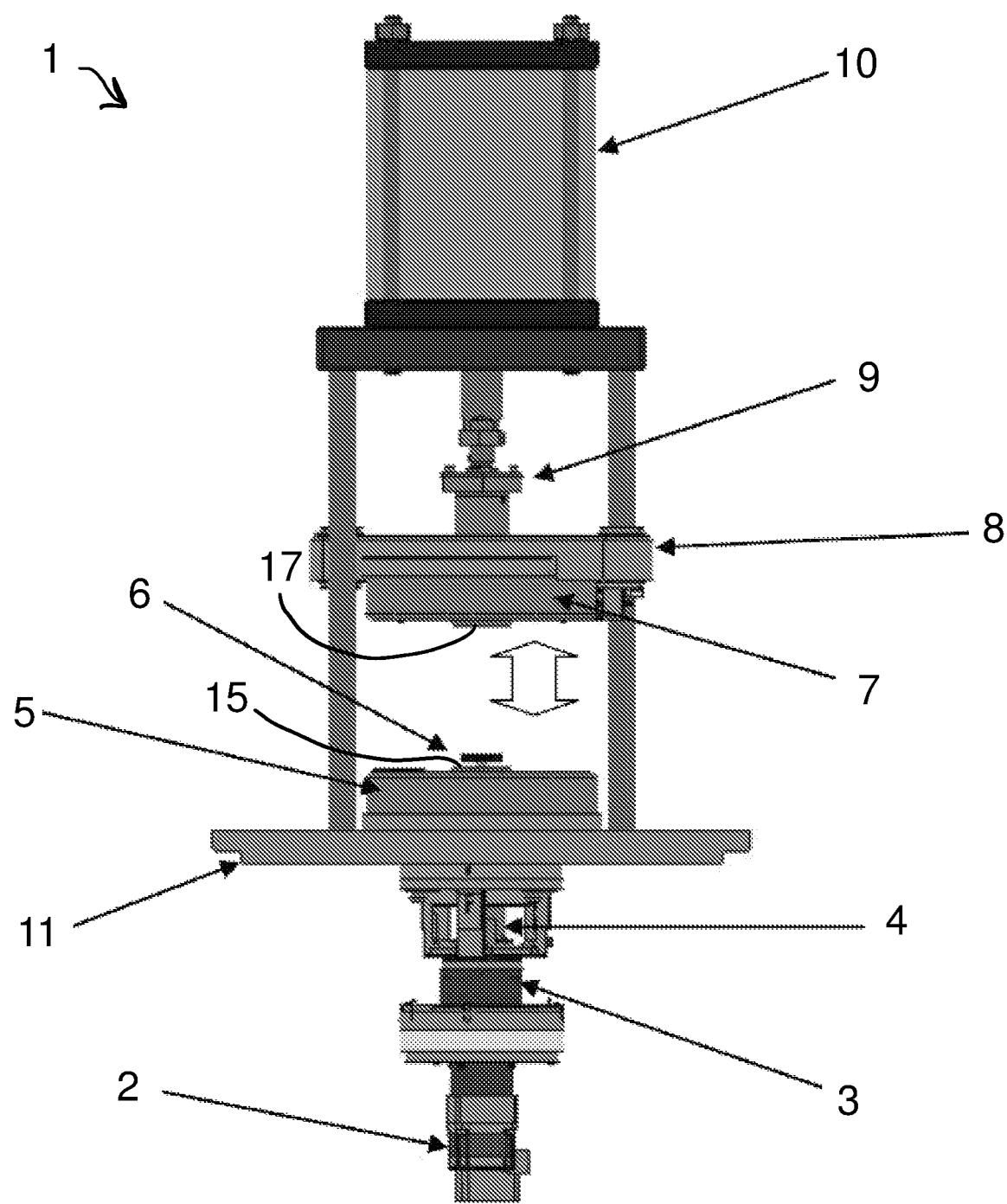
FIG. 1 depicts a conventional Mooney viscometer.
Figure 2:
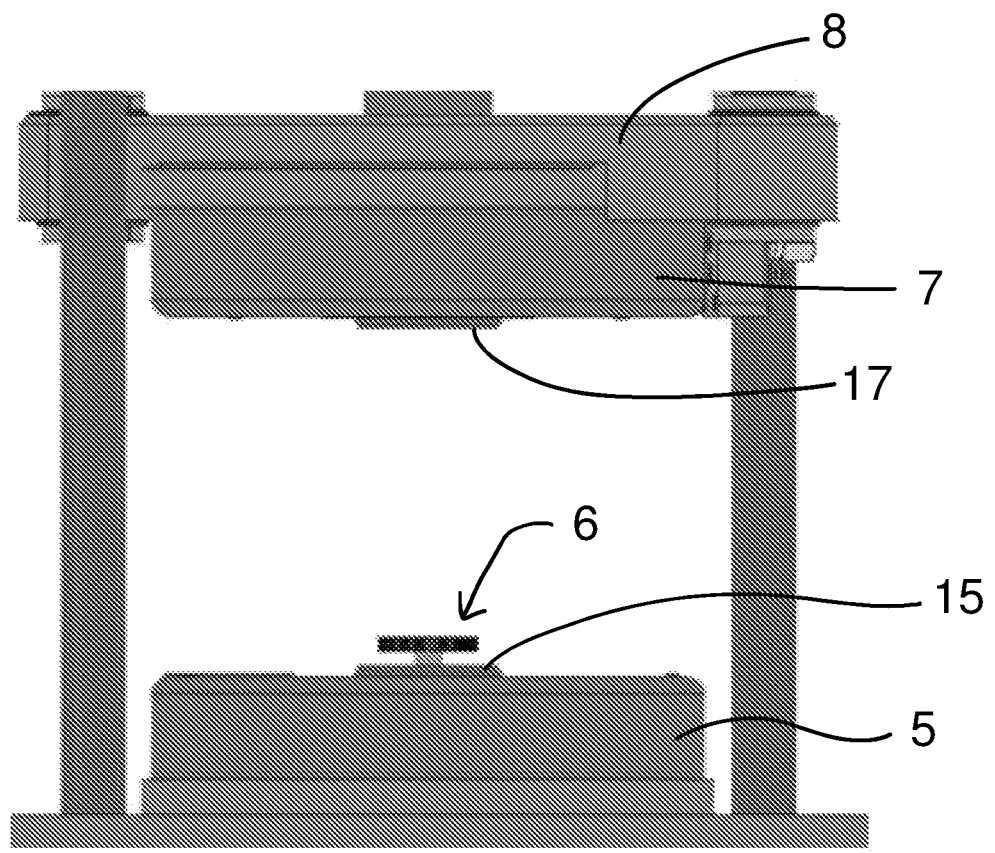
FIG. 2 depicts an enlarged portion of a conventional Mooney viscometer.

A conventional Mooney viscometer is depicted in FIG. 1. The viscometer has a rotor 6 that is located at the lower die 15 and lower platen 5. A support table 11 supports the lower platen 5. The lower die 15 meets with an upper die 17 to form the test cavity that encloses the rotor 6. A crosshead 8 moves the upper platen 7 and upper die 17 toward and away from the lower platen 5 and lower die 15. FIG. 2 depicts an enlarged view of the lower platen 5 and lower die 15, the upper platen 7 and upper die 17, crosshead 8 and rotor 6.

Figure 3A:
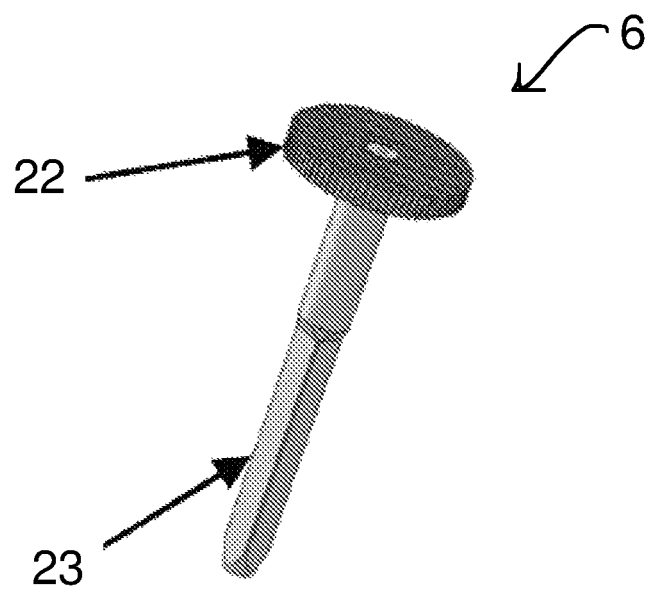
FIG. 3A depicts a rotor used in a Mooney viscometer.

The rotor 6, shown in greater detail in FIG. 3A, has a head 22 and a stem 23. In some embodiments, at least a portion of the rotor stem 23 has a square cross-section and is inserted into a mating square recess of a drive shaft 4 that is used to rotate the rotor. The rotor 6 is removably couplable to the drive shaft 4 and is typically removed after each measurement to remove the used sample and to load new sample. In some embodiments, there is no locking mechanism that secures the rotor stem to the drive shaft. Instead, the rotor stem is free to move up and down relative to the drive shaft. In some embodiments, the rotor head and/or the interior walls of the test cavity formed by the upper and lower dies may be striated or otherwise textured to decrease slippage of the sample during testing.

While the rotor stem and drive shaft recess are square in this illustrative embodiment, it should be appreciated that the rotor stem and recess of the drive shaft may be any suitable shape that would allow the rotor stem to mate with the recess. In some cases, the recess and rotor stem may also be a shape that would allow the drive shaft to turn the rotor stem without needing to lock the drive shaft to the rotor stem (e.g., not a circular cross-section). It should also be appreciated that, in some embodiments, a first portion of the rotor stem is a first shape and a second portion of the rotor stem is a second, different shape. For example, in the embodiment shown in FIG. 3A, a first portion of the rotor stem has a square cross-section, and a second portion of the rotor stem has a circular cross-section.

Figure 3B:
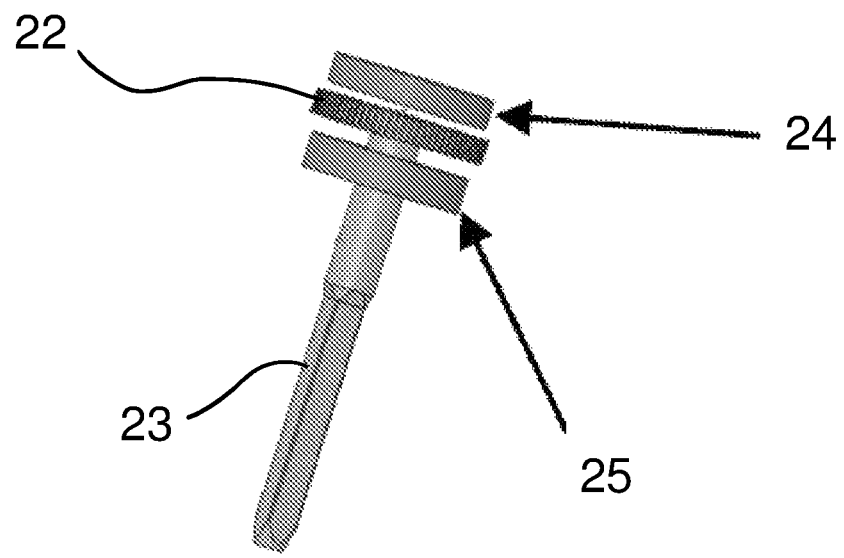
FIG. 3B depicts the rotor of FIG. 3A loaded with an upper sample and a lower sample.

Prior to a measurement, a first piece of sample is loaded below the rotor head and a second piece of sample is loaded above the rotor head, as shown in FIG. 3B. The lower sample 25 is coupled to the rotor by piercing through the sample 25 with the bottom of the rotor stem 23 and moving the sample up along the rotor stem toward the rotor head 22. The upper sample 24 is placed on top of the rotor head 22, usually after the rotor has been inserted into the recess of the drive shaft. In some cases, a piece of testing film may be placed above the upper sample 24. Alternatively or in addition, a piece of testing film may be placed below the lower sample 25 (e.g., by piercing through the film with the rotor stem and moving the film up along the rotor stem toward the bottom of the lower sample 25). Such film may serve as a barrier between the sample and the dies to help keep the sample from sticking to the upper and/or lower dies. However, in other cases, testing film is not used and the sample may come into direct contact with one or both dies.

The viscometer includes an air cylinder 10 and crosshead coupling 9 that are used to move a crosshead 8 up and down relative to the lower platen 5 and lower die 15. The crosshead 8 moves the upper platen 7 and upper die 17 in a downward direction toward the lower platen 5 and lower die 15 to form a test chamber defined by the upper and lower dies 17, 15 that encloses the sample and rotor head 22. A drive motor 2 and drive shaft 4 rotate the rotor 6 at a pre-defined speed, and a transducer 3 coupled to the rotor stem measures the amount of torque needed to rotate the rotor head within the sample.

The inventor has appreciated that, with a conventional Mooney viscometer, if the rotor is not properly seated in the drive shaft recess, closing the platens can cause the rotor stem to be jammed into the drive shaft, which can damage the drive shaft and/or the rotor stem, often requiring these components to be replaced. Misalignment between the rotor stem and the drive shaft recess can occur due to a variety of reasons, including, but not limited to, the use of an excessive volume of sample, failure to fully insert the rotor into the drive shaft recess or the presence of obstructing debris under the rotor head and/or within the drive shaft recess.

The inventor has also appreciated that, with a Mooney viscometer, because the rotor is not secured to the drive shaft (i.e. there is no locking arrangement that secures the rotor to the drive shaft), the sample and rotor can attach to the upper die and be lifted up away from the drive shaft when the platens are opened, particularly when the sample is in direct contact with the upper die. If the operator fails to notice the rotor stuck to the upper die and closes the platens, the rotor stem can hit the lower die, resulting in damage to the lower die and/or to the rotor, and/or the rotor can be jammed into the drive shaft recess.

The inventor has recognized the need for an arrangement that helps to prevent these possible failure modes. Described herein are arrangements and methods for preventing damage due to a misplaced rotor. According to one aspect, a Mooney viscometer arrangement includes a detection system for detecting the proper placement of a rotor. If the system detects improper placement of the rotor, an error is detected. According to a second aspect, if an error is detected, the system may respond to the error in a number of ways. A control process may be used to control the operation of the Mooney viscometer based on the detected error.

Detection of an Error

As discussed above, according to one aspect, a Mooney viscometer arrangement includes a detection system for detecting the proper placement of a rotor.

In some embodiments, the Mooney viscometer arrangement includes a detection system that detects the presence of an obstruction between the upper and lower dies while the platens are opened. When an obstruction is detected between the dies, an error is detected.

Figure 4:
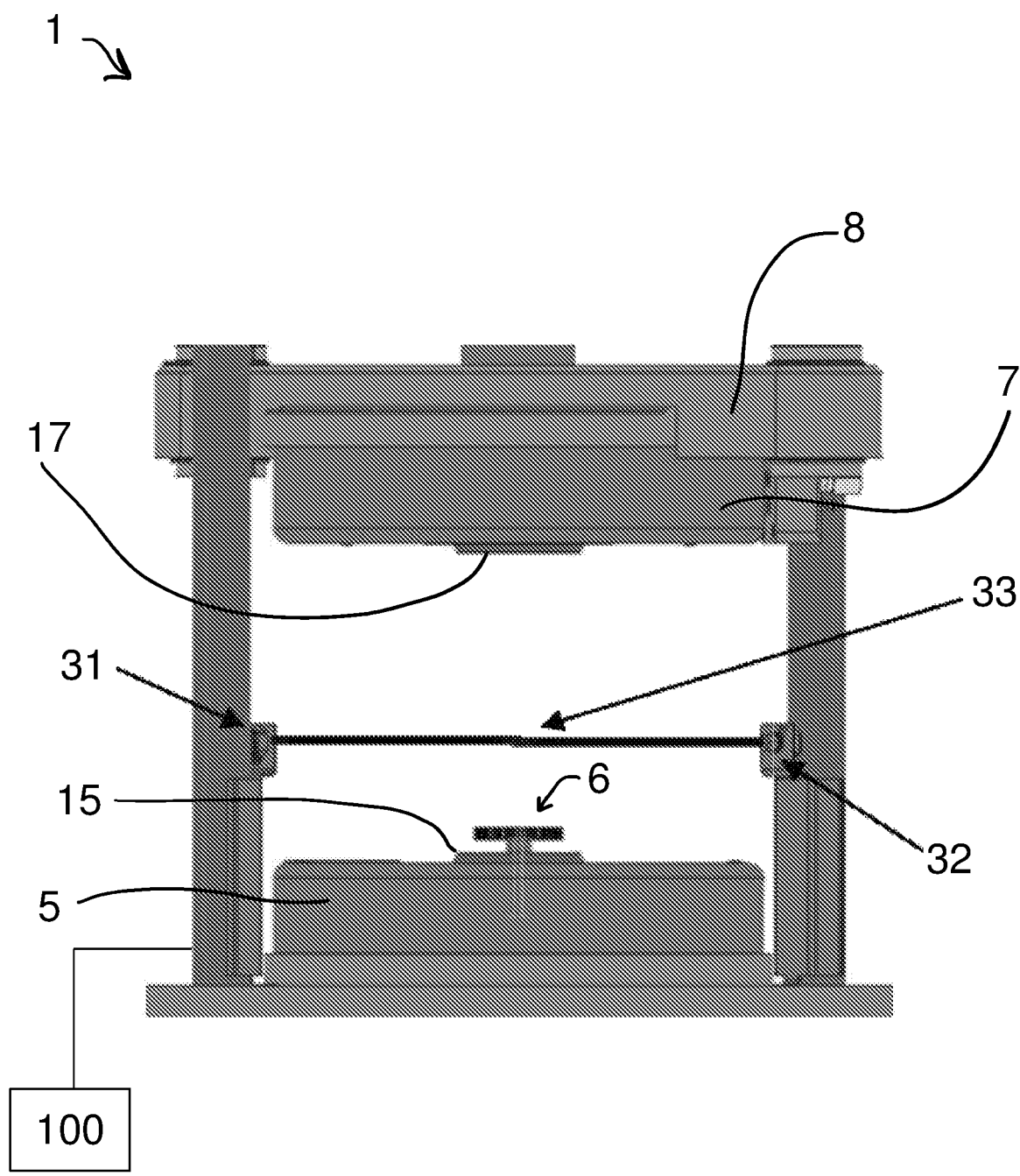
FIG. 4 depicts an enlarged portion of a Mooney viscometer having a rotor detection arrangement according to one aspect.

One illustrative embodiment of such an arrangement is shown in FIG. 4. The Mooney viscometer arrangement 1 may include an optical detection system, which may include a transmitter 31 and a receiver 32. The transmitter 31 is arranged to emit a light beam 33 toward the receiver 32. The receipt of the light beam by the receiver provides an indication that there is no obstruction present between the upper and lower dies 17, 15, at least along the line of the beam 33. For example, in the illustration shown in FIG. 4, with the rotor 6 properly positioned within the drive shaft recess, there is no obstruction of the light beam 33, such that the light beam is received by the receiver 32.

Figure 5:
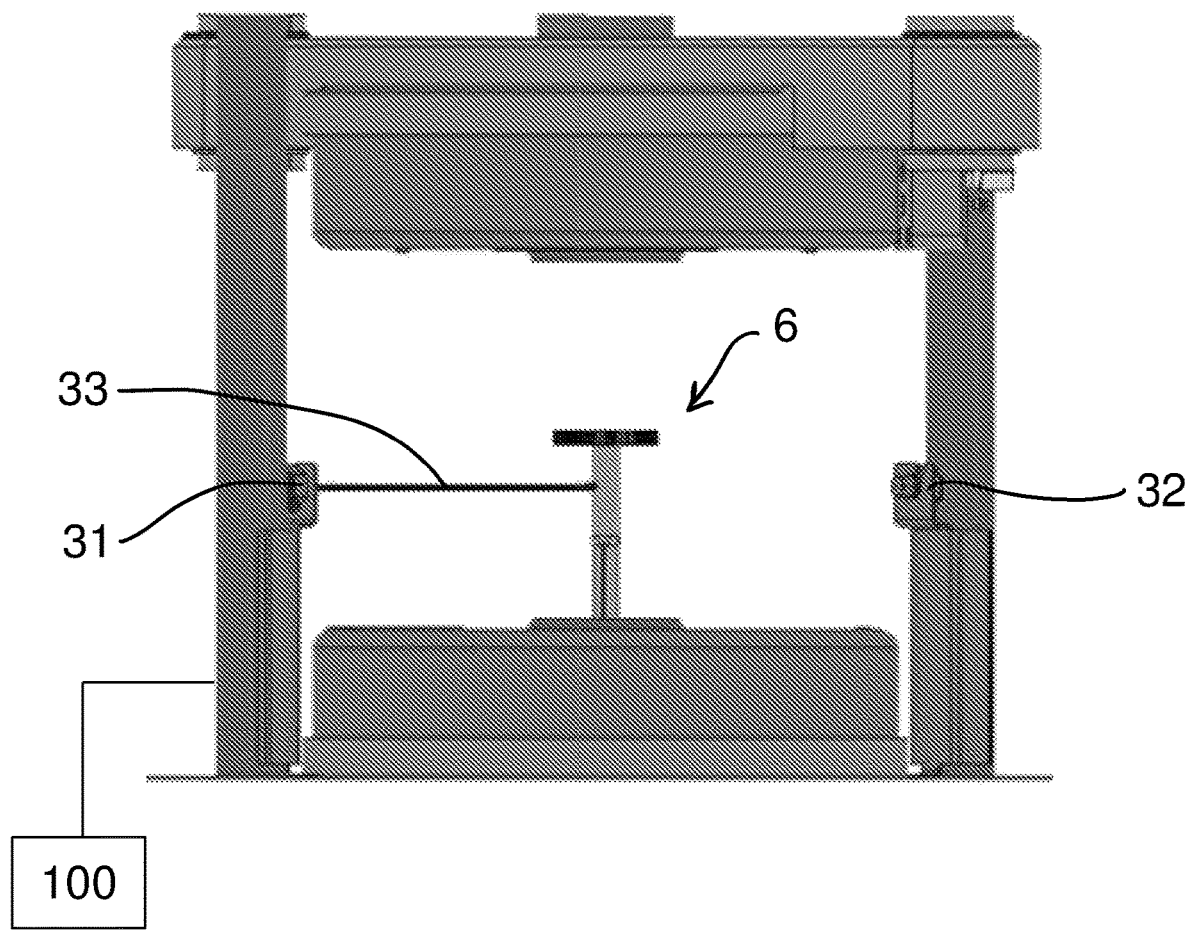
FIG. 5 depicts the Mooney viscometer of FIG. 4 detecting a first failure mode.

FIG. 5 shows a first possible failure mode that is detectable by this arrangement. In FIG. 5, the rotor 6 is not properly positioned within the drive shaft recess, such that it is positioned higher than its proper position. The light beam 33 coincides with the rotor 6, and thus the rotor blocks the light beam from reaching the receiver 32. As a result, the receiver does not receive the light beam, and the receiver does not send a signal to the controller 100 or sends a specific signal that signifies the presence of an obstruction, resulting in an error state.

Figure 6:
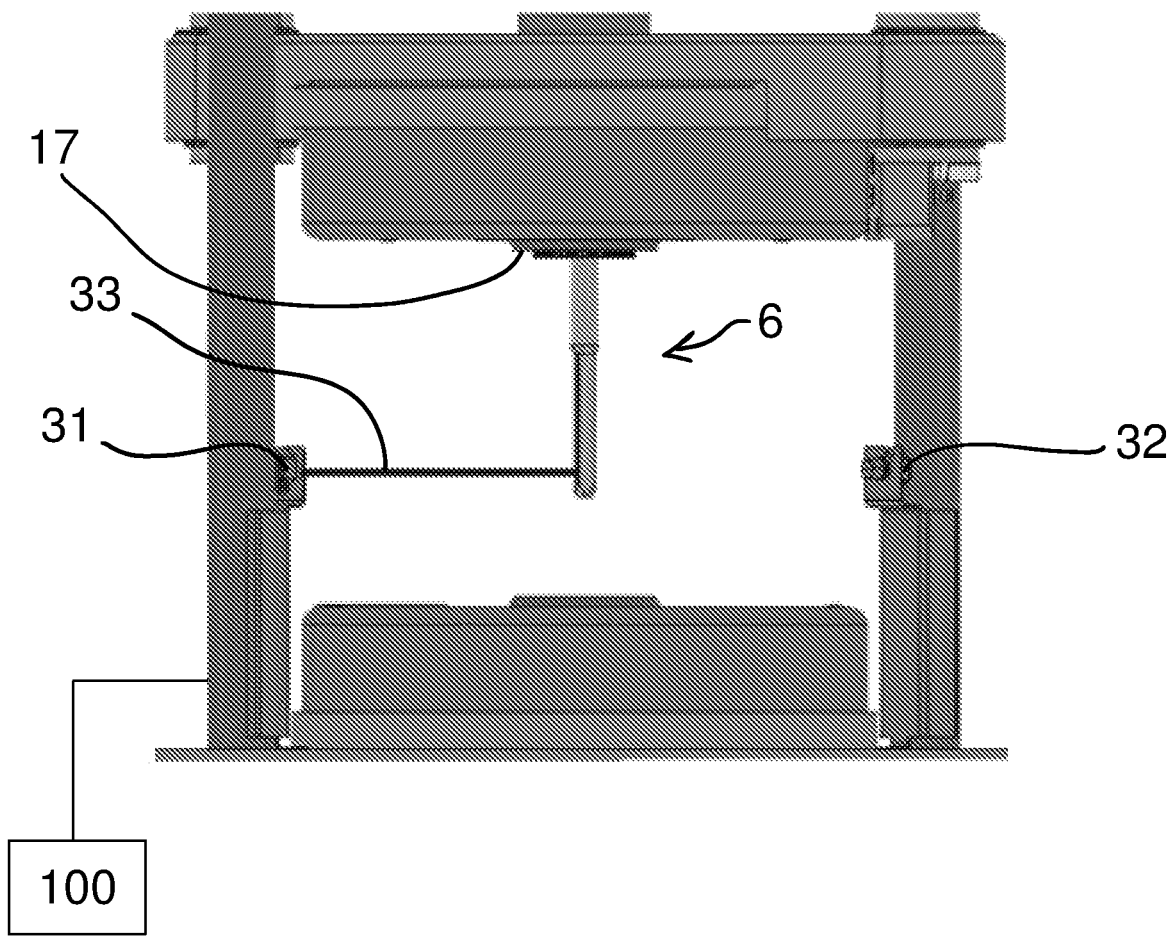
FIG. 6 depicts a Mooney viscometer of FIG. 4 detecting a second failure mode.

FIG. 6 depicts a second possible failure mode that is detectable by this arrangement. In FIG. 6, the rotor remains attached to the upper die 17 after opening of the platens. The light beam 33 coincides with the rotor 6, and thus the presence of the rotor blocks the light beam from reaching the receiver 32. As a result, the receiver does not receive the light beam, and the receiver does not send a signal to the controller 100 or sends a specific signal that signifies the presence of an obstruction, resulting in an error state.

Any portion of the rotor may interrupt the light beam—e.g., the rotor head or stem. In some cases, with either failure mode, the rotor may partially block the light beam, such that a partial amount of light is still received by the receiver. In some embodiments, receipt of only a partial amount of light by the receiver is registered by the receiver as an obstruction. The receiver does not send a signal to the controller 100 or sends a specific signal that signifies the presence of a partial obstruction, resulting in an error state. In some embodiments, a mask such as a slit mask may be included on the receiver in order to reduce the width of the beam reaching the sensing area on the receiver. In some cases, including such a mask may increase the likelihood that a partial obstruction will result in no light received by the receiver. Such an arrangement may be useful for receivers that are unable to distinguish between receipt of a full amount of light and only a partial amount of light. The mask may have one or more openings of any suitable size and shape, such as a slit, a circular or elliptical hole, etc.

It should be appreciated that different sensing modes may be used, including, but not limited to, a through-beam arrangement, a retroreflective arrangement, or a proximity-sensing arrangement. The arrangement in FIG. 4 is an example of through-beam arrangement, in which a receiver is located within the line-of-sight of the transmitter. In this mode, an obstruction is detected when the light beam is blocked from getting to the receiver from the transmitter.

In a retroreflective arrangement, a reflector is used to reflect the light beam from the transmitter to the receiver. As a result, the receiver can be located in a variety of different positions relative to the transmitter other than within the line-of-sight of the transmitter. In some embodiments, the transmitter and receiver are located on the same side of the sensing area (as opposed to opposite sides of the sensing area). In some embodiments, the transmitter and receiver are located very close to one another. In some embodiments, the transmitter and receiver are located within the same housing.

In a proximity-sensing arrangement, the transmitted light beam reflects off the object and is received by the receiver. In this mode, an obstruction is detected when the receiver receives the transmitted source rather than when it fails to receive the transmitted source. In some embodiments, the transmitter transmits a beam of light that diffuses in all directions, filling a detection area. If an object is positioned within the detection area, the object deflects part of the beam back to the receiver, indicating the presence of an obstruction, which is registered as an error. If no light is received by the receiver, no obstruction is detected.

In some embodiments, the receiver may send different types of signals to a controller depending on what is detected. For example, the receiver may send a first type of signal to the controller when the energy transmission is received, and a second, different type of signal that is when no energy transmission is received. The controller recognizes each signal type as indicating whether or not there is an error. In some embodiments, a third type of signal different from the first and second signal types may be sent when a partial amount of energy transmission is received.

It should also be appreciated that any suitable light source may serve as the transmitter and any suitable detector may serve as the receiver. Different types of light may serve as the energy transmission, e.g., infrared, visible red, laser, or any other suitable type of light. In one embodiment, the transmitter and receiver is the EX-31B Threaded Miniature Photoelectric Sensor (PANASONIC) that utilizes infrared light.

It should be appreciated that, in some embodiments, the sensing range between the transmitter and the receiver may be longer than the width of the platens. In some embodiments, the sensing range between the transmitter and receiver may be 500 mm. The transmitter and receiver are thus positioned at a distance less than 500 mm from one another. In some embodiments, the transmitter and receiver may be positioned 300-400, 300-350, 310-350, or 310 mm away from one another.

While the above embodiments discuss the use of optical detection systems, it should be appreciated that, in other embodiments, non-optical arrangements may be used. For example, forms of energy other than light may serve as the energy transmission, e.g., magnetic fields, radio waves and the like. Any suitable sensors may be used to detect the rotor's presence, such as magnetic, inductive, resistive, capacitive or other sensors used to detect a magnetic or other physical characteristic of a rotor located between the upper and lower dies at an improper position.

In some embodiments, the Mooney viscometer arrangement may include a detection system that detects the presence of the rotor stem inside the drive shaft recess, indicating that the rotor stem has been fully and properly received inside the drive shaft. If the presence of the rotor stem inside the drive shaft recess is not detected, an error state results. Any suitable sensor may be used to detect the presence of the rotor stem inside the drive shaft recess. For example, a switch that is physically actuated by the rotor stem and/or the rotor head, a photoelectric sensor, Hall effect sensors, magnetic, inductive, resistive, capacitive or any other suitable sensors to, e.g., detect a magnetic or other physical characteristic of a rotor stem. In one embodiment, the rotor stem or the rotor head (e.g. the rotor head underside) may have an RFID tag or other readable indicator that is readable by a detector to indicate the presence of the rotor.

In some embodiments, the Mooney viscometer arrangement may include a detection system that detects the presence of extra material on the upper platen and/or die. The detection system may be configured to provide an indication of an error state when additional material on the upper platen and/or die is detected. In one embodiment, the upper platen and die assembly may be coupled to a device that monitors the weight of the assembly and can detect an increase in weight. For example, the upper platen and die assembly may be coupled to a scale. An increase in weight may indicate the attachment of debris and/or the rotor onto the upper die and/or upper platen. Detection of this increase in weight may trigger an error state.

Responding to a Detected Error

As discussed above, according to one aspect, when an error is detected, the system may respond in a number of ways, alone or in combination. The system may trigger an alarm, e.g., visual, auditory or both, to an operator, indicating that an obstruction is present. The system may prohibit closure of the platens until the presence of the obstruction is resolved and no longer detected. In some cases, the system may include an override option that permits an operator to close the platens despite the detection of an obstruction.

Figure 7:
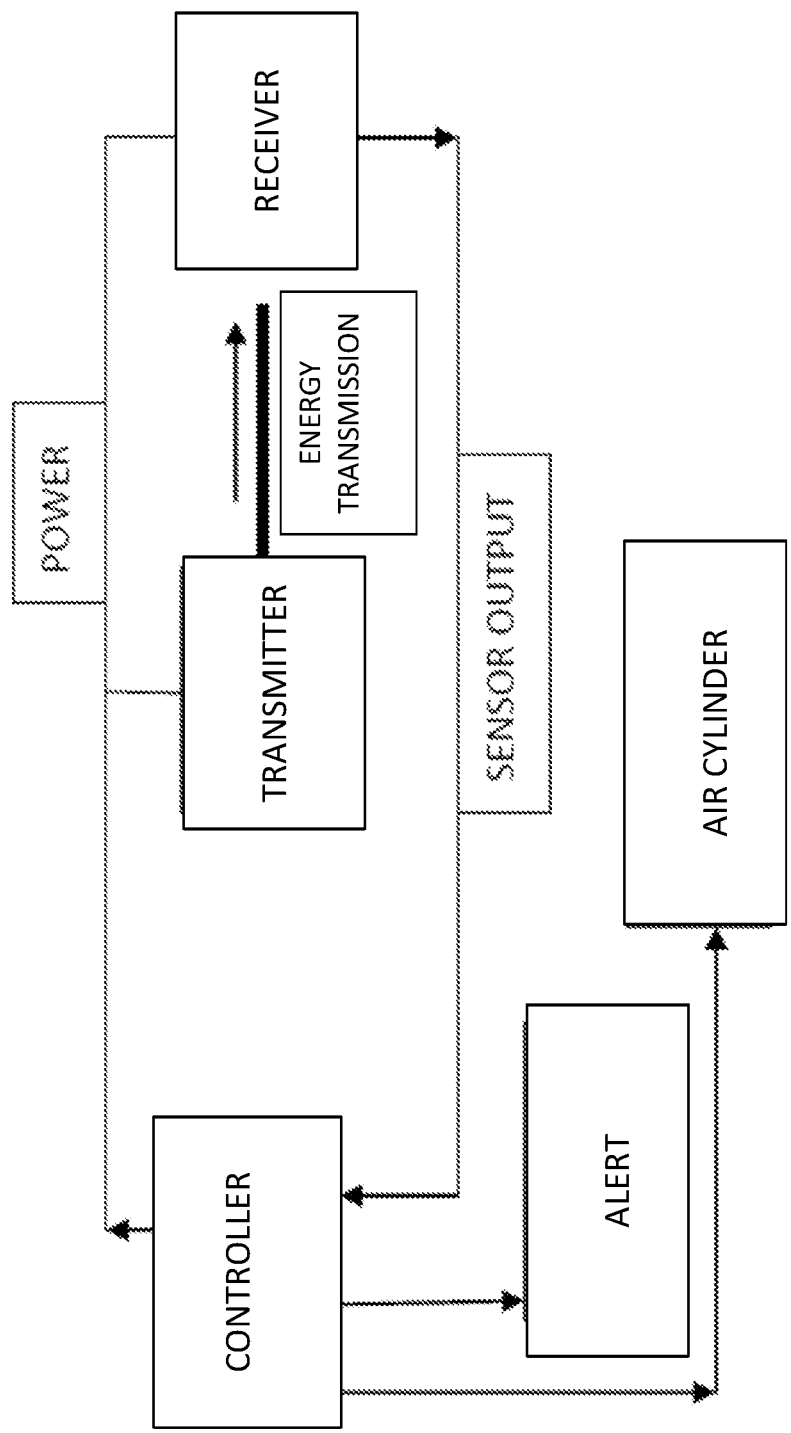
FIG. 7 depicts a control process for rotor detection.

FIG. 7 depicts one embodiment of a control process for rotor detection that is specific to a detection system having a transmitter that transmits an energy transmission (e.g., a light beam or other suitable energy form) that is received by a receiver. When the energy transmission from the transmitter is received by the receiver, the receiver sends a signal to the controller, which communicates to the controller that it is safe to proceed. In response, the controller permits the air cylinder to move the upper platen and die assembly to the closed position. In contrast, when the energy transmission from the transmitter is not received by the receiver, the receiver may either fail to send any signal to the controller or send a signal of a different type indicating the presence of an obstruction, which communicates to the controller that there is an error. In response, the controller may issue an alert, and/or may prohibit the air cylinder from moving the upper platen and die assembly to the closed position.

In some embodiments, the system may include an automated arrangement of clearing obstructions and/or properly aligning the rotor, rather than requiring a human operator to do so.

Other features of a conventional Mooney viscometer may be used in connection with the arrangement discussed herein. Such additional features will be readily apparent to one of skill in the art.

It should be appreciated that the Mooney viscometer arrangement described here may be formed with one or more of the above-described features. The above aspects and features may be employed in any suitable combination as the present invention is not limited in this respect. It should also be appreciated that the drawings illustrate various components and features which may be incorporated into various embodiments of the invention. For simplification, some of the drawings may illustrate more than one optional feature or component. However, the invention is not limited to the specific embodiments disclosed in the drawings. It should be recognized that some embodiments may include only a portion of the components illustrated in any one drawing figure, and/or may also encompass embodiments combining components illustrated in multiple different drawing figures.

It should be appreciated that, while embodiments described herein discuss arrangements involving a Mooney viscometer, the detection arrangements and methods described above may be used with other types of viscometers as well. Such detection arrangements may be used to detect proper alignment between components and/or unwanted obstructions between the upper and lower dies and/or platens.

It should be understood that the foregoing description of various embodiments of the invention are intended merely to be illustrative thereof and that other embodiments, modifications, and equivalents of the invention are within the scope of the invention recited in the claims appended hereto.

What is claimed is:

1. A viscometer for measuring properties of a sample material, comprising:
    a rotor including a rotor head and a rotor stem;
    a motor and a drive shaft coupled to the motor, the rotor being removably couplable to the drive shaft;
    an upper platen, an upper die, a lower platen and a lower die, the upper and lower dies having an open position to receive a sample therebetween and a closed position to define a sealed test chamber that encloses the rotor head and the sample, the upper and lower dies being separated by a space when in the open position;
    a crosshead coupled to the upper platen, the crosshead adapted to move the upper platen and the upper die relative to the lower platen and lower die;
    a controller;
    a transmitter being positioned to transmit an energy transmission over the lower die and across the space when the upper and lower dies are in the open position; and
    a receiver adapted to receive the energy transmission and to output a signal to the controller when the energy transmission is received by the receiver,
    the controller being configured to control closure of the upper and lower dies in response to receipt of the signal from the receiver.

2. The viscometer of claim 1, wherein the energy transmission includes a light beam.

3. The viscometer of claim 1, wherein the controller permits closure of the upper and lower dies in response to receipt of the signal from the receiver.

4. The viscometer of claim 1, wherein the controller prohibits closure of the upper and lower dies in response to receipt of the signal from the receiver.

5. The viscometer of claim 1, wherein the controller outputs an alert when the signal is received.

6. The viscometer of claim 1, wherein the controller outputs an alert in response to non-receipt of the signal from the receiver.

7. The viscometer of claim 1, wherein there is an absence of a locking arrangement between the rotor and the drive shaft.

8. The viscometer of claim 1, wherein the viscometer comprises a Mooney viscometer.

9. The viscometer of claim 1, further comprising a reflector that is positioned to reflect the energy transmission from the transmitter to the receiver.

10. The viscometer of claim 1, wherein the energy transmission includes infrared light.

11. A method of detecting proper rotor alignment in a viscometer, comprising acts of:
    (a) providing a rotor that is removably couplable to a drive shaft that drives the rotor, the rotor including a rotor head;
    (b) providing an upper platen, an upper die, a lower platen and a lower die, the upper and lower dies having an open position to receive a sample therebetween and a closed position to define a sealed test chamber that encloses the rotor head and the sample, the upper and lower dies being separated by a space when in the open position;
    (c) transmitting an energy transmission over the lower die and across the space when the upper and lower dies are in the open position;
    (d) sending a signal to a controller when the energy transmission is received by a receiver; and
    (e) controlling closure of the upper and lower dies in response to the controller receiving the signal from the receiver.

12. The method of claim 11, wherein act (e) includes prohibiting closure of the upper and lower dies in response to receipt of the signal from the receiver.

13. The method of claim 11, wherein act (e) includes permitting closure of the upper and lower dies in response to receipt of the signal from the receiver.

14. The method of claim 11, wherein act (c) includes transmitting a light beam.

15. The method of claim 11, wherein act (c) includes transmitting infrared light.

16. The method of claim 11, further comprising:
    (f) reflecting the energy transmission from a transmitter to the receiver.

17. The method of claim 11, wherein the act (c) includes hitting an obstruction with the energy transmission.

18. The method of claim 17, wherein the obstruction blocks at least a portion of the energy transmission from reaching the receiver.

19. The method of claim 18, wherein act (e) includes prohibiting closure of the upper and lower dies.

20. The method of claim 11, wherein the viscometer comprises a Mooney viscometer.

* * * * *